United States Patent
Chen et al.

(10) Patent No.: US 9,491,386 B2
(45) Date of Patent: Nov. 8, 2016

(54) FLOATING DIFFUSION RESET LEVEL BOOST IN PIXEL CELL

(71) Applicant: OMNIVISION TECHNOLOGIES, INC., Santa Clara, CA (US)

(72) Inventors: Qingfei Chen, Santa Clara, CA (US); Duli Mao, Sunnyvale, CA (US); Han Lei Lock, San Jose, CA (US); Qingwei Shan, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/559,733

(22) Filed: Dec. 3, 2014

(65) Prior Publication Data
US 2016/0165165 A1 Jun. 9, 2016

(51) Int. Cl.
*H04N 5/374* (2011.01)
*H04N 5/378* (2011.01)
*H04N 5/63* (2006.01)
*H04N 5/335* (2011.01)

(52) U.S. Cl.
CPC ............ *H04N 5/3741* (2013.01); *H04N 5/335* (2013.01); *H04N 5/378* (2013.01); *H04N 5/63* (2013.01)

(58) Field of Classification Search
CPC ...... H04N 5/335; H04N 5/208; H04N 5/378; H04N 5/3745; H04N 5/3741; H04N 5/63
See application file for complete search history.

(56) References Cited

U.S. PATENT DOCUMENTS

| | | | | |
|---|---|---|---|---|
| 2005/0062867 A1* | 3/2005 | Mabuchi | ............... | H04N 5/3559 348/308 |
| 2005/0206764 A1* | 9/2005 | Kobayashi | ........ | H01L 27/14659 348/308 |
| 2006/0119720 A1* | 6/2006 | Hong | ................. | H01L 27/14609 348/308 |
| 2007/0103574 A1* | 5/2007 | Tanaka | .................. | H04N 5/3559 348/308 |
| 2008/0170147 A1* | 7/2008 | Barbier | ................ | H04N 5/3745 348/308 |
| 2009/0237539 A1* | 9/2009 | Watanabe | .......... | H04N 5/37452 348/301 |
| 2009/0272879 A1* | 11/2009 | Dai | ...................... | H04N 5/3559 250/208.1 |
| 2010/0271517 A1* | 10/2010 | De Wit | ................... | H04N 5/378 348/294 |
| 2011/0267522 A1* | 11/2011 | Gendai | .................. | H04N 5/378 348/308 |
| 2012/0132786 A1* | 5/2012 | Mori | ...................... | H04N 5/355 250/208.1 |
| 2013/0147997 A1* | 6/2013 | Naganokawa | ........ | H01L 27/148 348/302 |

OTHER PUBLICATIONS

TW Patent Application No. 104140387—Taiwanese Office Action and Search Report, issued Aug. 8, 2016, with English Translation, 17 pages.

* cited by examiner

*Primary Examiner* — Abdelaaziz Tissire
(74) *Attorney, Agent, or Firm* — Blakely Sokoloff Taylor & Zafman LLP

(57) ABSTRACT

A reset level in a pixel cell is boosted by switching ON a reset transistor of the pixel cell to charge the floating diffusion to a first reset level during a reset operation. A select transistor is switched from OFF to ON during the floating diffusion reset operation to discharge an output terminal of an amplifier transistor. The reset transistor is switched OFF after the output terminal of the amplifier transistor has been discharged in response to the switching ON of the select transistor. The output terminal of the amplifier transistor charges to a static level after being discharged. The floating diffusion coupled to the input terminal of the amplifier transistor follows the output terminal of the amplifier transistor across an amplifier capacitance coupled between the input terminal and the output terminal of the amplifier transistor to boost the reset level of the floating diffusion.

22 Claims, 4 Drawing Sheets

FLOATING DIFFUSION RESET LEVEL BOOST IN PIXEL CELL

BACKGROUND INFORMATION

1. Field of the Disclosure

This invention is related to image sensors. In particular, embodiments of the present invention are related to pixels having floating diffusions.

2. Background

Image sensors have become ubiquitous. They are widely used in digital cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, the demands of higher resolution and lower power consumption have encouraged the further miniaturization and integration of these image sensors.

In a conventional CMOS active pixel cell, image charge is transferred from a photosensitive device (e.g., a photodiode) and is converted to a voltage signal inside the pixel cell on a floating diffusion node. The floating diffusion of each pixel cell is reset to a reset level before the image charge is transferred from the photosensitive device to the floating diffusion for each exposure. In general, a higher reset level in the floating diffusion helps to accommodate a larger full well capacity (FWC) in the floating diffusion, which helps to provide improved performance and image quality. In addition, it is appreciated that a higher floating diffusion reset level can also improve image lag performance of the pixel cell. A known solution to increase reset levels in floating diffusions is to add additional circuitry to pixel cells, which consequently results in additional costs and consumes valuable chip real estate.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
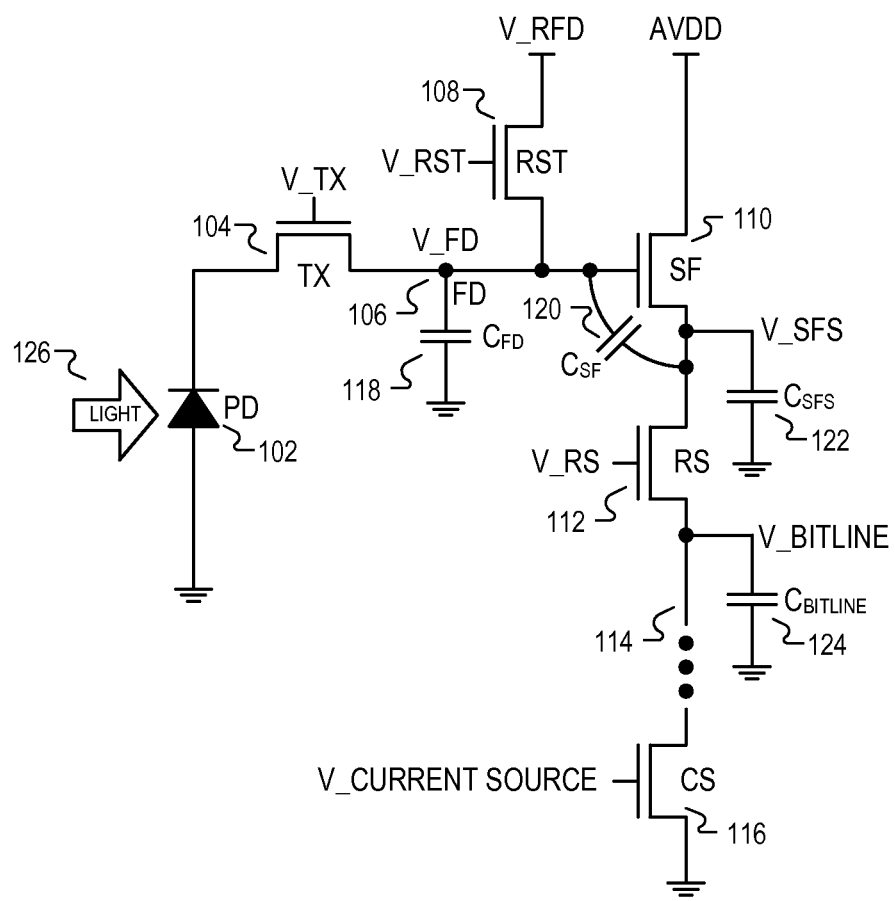
FIG. 1 shows one example schematic of a pixel cell including a floating diffusion with a boosted reset level in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Methods and apparatuses for implementing an example pixel cell in which the floating diffusion reset level is boosted are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

As will be shown, examples of a pixel cell in an image sensor with a boosted floating diffusion reset level are disclosed. In various examples, a floating diffusion in an example pixel cell is boosted by utilizing a capacitance between the input terminal and the output terminal of an amplifier transistor in the pixel cell in accordance with the teachings of the present invention. For instance, in one example, the amplifier transistor in a pixel in accordance with the teachings of the present invention is a source follower coupled transistor and the gate source capacitance of the source follower coupled transistor is utilized to boost the reset level of the floating diffusion that is coupled to the gate terminal of the source follower coupled transistor. In one example, the select transistor of the pixel cell, such as for example the row select transistor, is coupled to the output terminal of the source follower transistor. In the example, the select transistor switched from OFF to ON for a time duration before the reset transistor is switched OFF during a reset operation of the floating diffusion. Right after the select transistor is switched from OFF to ON, the output terminal voltage of the amplifier transistor is temporarily pulled down forming a glitch. After the glitch, the output terminal voltage of the amplifier transistor is then restored to its static level. As a result, the voltage on the input terminal of the amplifier transistor is also boosted across the gate to source capacitance of the amplifier transistor. Since the floating diffusion is coupled to the input terminal of the amplifier transistor, the reset level of the floating diffusion of the pixel cell is also boosted in accordance with the teachings of the present invention.

To illustrate, FIG. 1 shows one example schematic of a pixel cell 100 including a floating diffusion with a boosted reset level in accordance with the teachings of the present invention. In the illustrated example, pixel cell 100 includes a photodiode 102 disposed in a semiconductor of an imaging sensor chip. In the example, photodiode 102 is coupled to photogenerate charge in response to light 126 that is incident upon photodiode 102. A transfer transistor 104 is disposed within the semiconductor and is coupled to the photodiode 102 to transfer the photogenerated charge from the photodiode 102 in response to a signal V_TX.

A floating diffusion 106 is disposed in the semiconductor and is coupled to the transfer transistor 104. As shown in the depicted example, floating diffusion 106 includes a floating diffusion capacitance $C_{FD}$ 118, which is coupled to receive the charge transferred from the photodiode 102 through the transfer transistor 104. A reset transistor 108 is coupled between a reset voltage V_RFD and the floating diffusion 106 to reset the charge in the floating diffusion 106 to a first reset level during a reset operation of floating diffusion 106.

An amplifier transistor 110 having an input terminal is coupled to the floating diffusion to generate an amplified signal at an output terminal of the amplifier transistor 110 in response to the charge in the floating diffusion 106. The amplifier transistor 110 includes an amplifier capacitance $C_{SF}$ 120 coupled between the input terminal and the output terminal of the amplifier transistor 110. For instance, in an example in which the amplifier transistor 110 is a source follower coupled transistor, the amplifier capacitance $C_{SF}$ 120 is a gate source capacitance of the amplifier transistor 110. As shown in the depicted example, a source capacitance $C_{SFS}$ 122 of the source follower coupled amplifier transistor 110 is coupled to the output terminal of amplifier transistor 110, and a V_SFS voltage is generated across the source capacitance $C_{SFS}$ 122.

A select transistor 112 is coupled between the output terminal of the amplifier transistor 110 and an output bitline 114 of the pixel cell 100. In one example, the select transistor 112 is a row select transistor of pixel cell 100 and outputs image data from pixel cell 100 in response to a V_RS signal to bitline 114. In one example, a current source transistor 116 is included in readout circuitry coupled to bitline 114, and is coupled to sink current from output bitline 114 in response to a V_CURRENT SOURCE signal as shown. As shown in the depicted example, a bitline capacitance $C_{BITLINE}$ 124 is coupled to the output terminal of select transistor 112, and a V_BITLINE voltage is generated across the bitline capacitance $C_{BITLINE}$ 124.

In one example, select transistor 112 is coupled to be switched from OFF to ON during a reset operation of floating diffusion 106 before the reset transistor 108 is coupled to be switched OFF. As a result, a reset level of the floating diffusion 106 is boosted through the amplifier capacitance $C_{SF}$ 120 from the first reset level to a second reset level in accordance with the teachings of the present invention. For instance, in the example depicted in FIG. 1, before the selected transistor 112 is switched from OFF to ON, the V_BITLINE voltage generated across bitline capacitance $C_{BITLINE}$ 124 is discharged to a reference voltage, such as for example ground, through the current source transistor 116. At the same time, floating diffusion 106 is coupled to reset voltage V_RFD through reset transistor 108, and the V_SFS voltage that is generated across the source capacitance $C_{SFS}$ 122 is discharged by AVDD through the amplifier transistor 110 to a voltage substantially equal to the voltage V_FD at the floating diffusion 106 minus a threshold voltage $V_{T\_SF}$ of the source follower coupled amplifier transistor 110 such that $$V\_SFS = V\_FD - V_{T\_SF}. \quad \text{(Equation 1)}$$

Stated in another way, the relationship of Equation 1 may also be rewritten as $$V\_FD = V\_SFS + V_{T\_SF}, \quad \text{(Equation 2)}$$

such that the floating diffusion voltage V_FD and the source voltage V_SFS follow each other with a voltage difference across the source capacitance $C_{SFS}$ 122 at this time substantially equal to the threshold voltage $V_{T\_SF}$.

Continuing with the example, right after the select transistor is switched from OFF to ON, the V_SFS voltage across the source capacitance $C_{SFS}$ 122 is temporarily pulled down forming a glitch, and then rises such that the V_SFS voltage is restored to its static level. The reset transistor 108 is turned OFF and the floating diffusion voltage V_FD follows the V_SFS voltage up across the amplifier transistor capacitance $C_{SF}$ 120, and is therefore boosted in accordance with the teachings of the present invention. Since the "bottom plate" of the amplifier capacitance $C_{SF}$ 120 follows the voltage V_FD of the floating diffusion 106, the boosting of the voltage V_FD of the floating diffusion 106 in accordance with the teachings of the present invention has very little side effects on conversion gain drop, similar to a "bottom plate" sampling effect of a charge hold capacitor in accordance with the teachings of the present invention.

Figure 2:
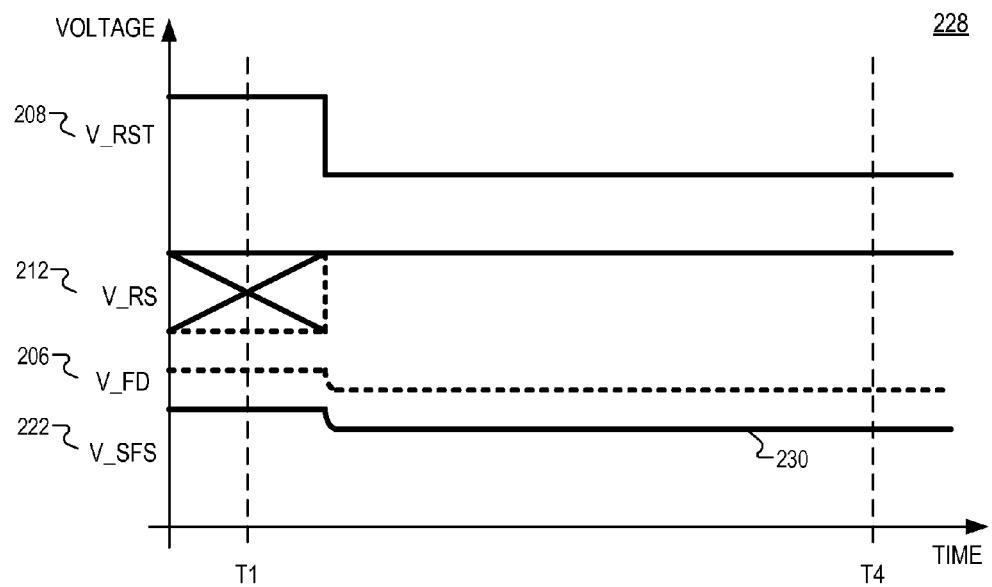
FIG. 2 shows an example timing diagram of an example pixel cell in which the floating diffusion reset level is not boosted in accordance with the teachings of the present invention.
Figure 3:
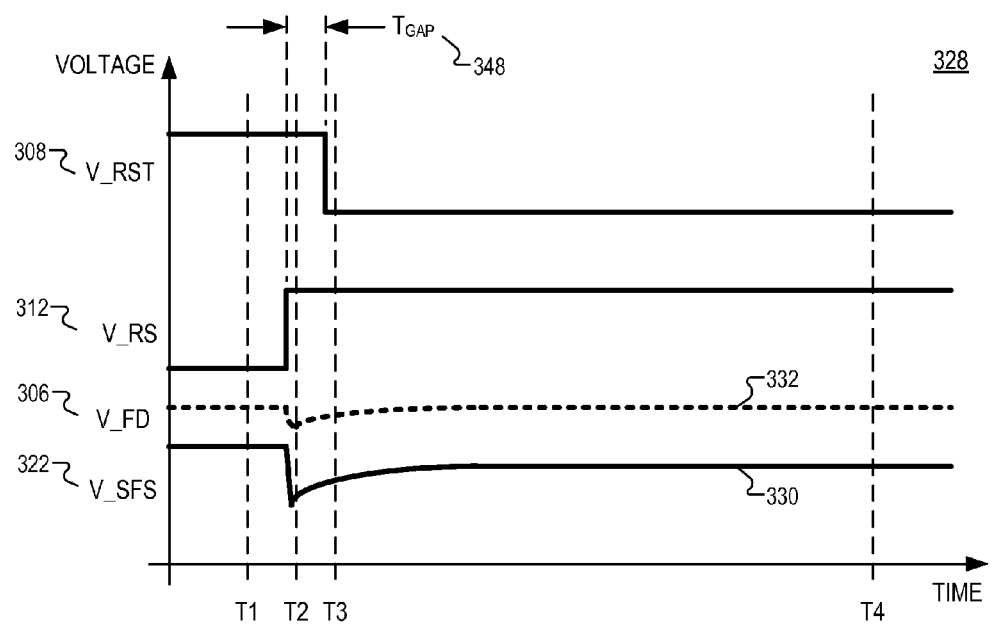
FIG. 3 shows an example timing diagram of an example pixel cell in which the floating diffusion reset level is boosted in accordance with the teachings of the present invention.

To illustrate, FIG. 2 shows an example timing diagram 228 of an example pixel cell in which the floating diffusion reset level is not boosted, and FIG. 3 shows an example timing diagram 328 of an example pixel cell in which the floating diffusion reset level is boosted in accordance with the teachings of the present invention. For instance, example timing diagram 228 of FIG. 2 shows an example in which the select signal is not switched from OFF to ON during a reset operation, while example timing diagram 328 of FIG. 3 shows an example in which the select signal is switched from OFF to ON during the reset operation. It is noted that the signals referred to in FIGS. 2-3 may be examples of signals referred to in FIG. 1, and it should therefore be appreciated that similarly named and numbered elements referenced below are coupled and function as described above.

In particular, FIG. 2 shows that select signal V_RS 212 is not switched from OFF to ON while the reset signal V_RST 208 is ON during a reset operation of the floating diffusion 106, e.g., around time T1. As shown, when the reset signal V_RST 208 is switched OFF after time T1, the voltage V_SFS 222 at the source terminal of the amplifier transistor 110 dips slightly and stabilizes at a static level 230 by time T4 after the reset operation. Accordingly, the floating diffusion voltage V_FD 206, which is a threshold voltage $V_{T\_SF}$ greater than V_SFS 222, also dips slightly as shown.

In comparison, FIG. 3 shows that during the reset operation of the floating diffusion 106, see e.g., time T1, reset signal V_RST 308 is switched ON, at which time the floating diffusion 106 is reset to a first reset level by being coupled to reset voltage V_RFD through reset transistor 108. At this time T1, the select signal V_RS 312 is switched OFF. While the select signal V_RS 312 is OFF, it is appreciated that the select transistor 112 is OFF and that the V_BITLINE voltage generated across bitline capacitance $C_{BITLINE}$ 124 is discharged to a reference voltage, such as for example ground, through the current source transistor 116. At the same time, the V_SFS voltage 322 that is generated across the source capacitance $C_{SFS}$ 122 is discharged by AVDD through the amplifier transistor 110 to a voltage substantially equal to the voltage V_FD 306 minus a threshold voltage $V_{T\_SF}$ of the source follower coupled amplifier transistor 110, as discussed above with respect to Equation 1.

Continuing with the example shown in FIG. 3, select signal V_RS 312 is then switched from OFF to ON at the beginning of a time $T_{GAP}$ 348 before the reset signal V_RST 308 is switched OFF. As shown in the depicted example, right after the select transistor 112 is switched ON in response to select signal V_RS 312, the $V\_S_{FS}$ 322 voltage across the source capacitance $C_{SFS}$ 122 is at first pulled down through select transistor 112 at time T2 forming a glitch, but then begins rising such that the $V\_S_{FS}$ voltage 322 is restored to its static level 330.

However, since the floating diffusion 106 is still coupled to reset voltage V_RFD through reset transistor 108 at time T2, the same glitch that occurs on the V_SFS voltage 322 at time T2 is not observed in the floating diffusion voltage V_FD 306. After the glitch, however, the reset signal V_RST 308 is then switched OFF, and the floating diffusion voltage V_FD 306 follows the V_SFS 322 voltage up across the amplifier capacitance $C_{SF}$ 120 as V_SFS 322 rises to the static level 330 after the glitch. As a result, the floating diffusion voltage V_FD 322 is therefore boosted to a second reset level 332 as illustrated for example during times T2, T3, and T4 in FIG. 3 in accordance with the teachings of the present invention.

Figure 4:
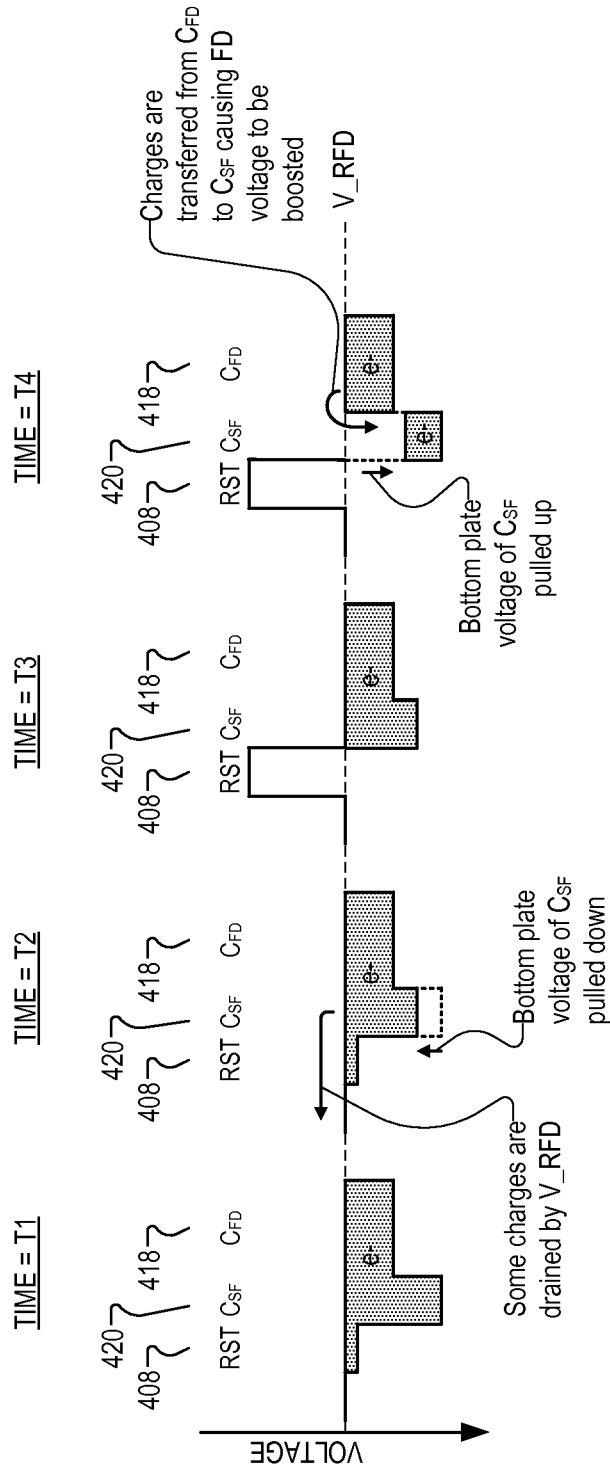
FIG. 4 shows an example diagram of illustrating charge levels in an example pixel cell at various times in which the floating diffusion reset level is boosted in accordance with the teachings of the present invention.

FIG. 4 shows an example charge level diagram 434 illustrating charge levels in an example pixel cell at various times in which the floating diffusion reset level is boosted in accordance with the teachings of the present invention. It is noted that the elements, signals, and times referred to in FIG. 4 may be examples of the elements, signals, and times referred to in FIGS. 1-3, and it should therefore be appreciated that similarly named and numbered elements, signals, and times referenced below are coupled and function as described above. Thus, the times T1, T2, T3, and T4 in FIG. 4 also correspond to the times T1, T2, T3, and T4 in FIG. 3.

At time T1, the example depicted in FIG. 4 illustrates that reset signal RST 408 is ON, with the charge levels in the source follower capacitance $C_{SF}$ 420 and the floating diffusion capacitance $C_{FD}$ 418 as shown. In the example, the floating diffusion capacitance $C_{FD}$ 418 at time T1 is coupled to the reset voltage V_RFD through the reset transistor 108, and the select transistor 112 is still switched OFF, which enables the V_BITLINE voltage generated across bitline capacitance $C_{BITLINE}$ 124 to be discharged to ground through the current source transistor 116, which results in the charge level in source follower capacitance $C_{SF}$ 420 as shown.

At time T2, the select signal V_RS 312 is ON while the reset signal V_RST 308 is still ON during the reset operation. Thus, the "top plate" of the source follower capacitance $C_{SF}$ 420 is still coupled to the V_RFD voltage through reset transistor 108, but the "bottom plate" of the source follower capacitance $C_{SF}$ 420 is pulled down through select transistor 112 in response to the select transistor 112 being switched ON. Thus, some of the charges in source follower capacitance $C_{SF}$ 420 are drained from the source follower capacitance $C_{SF}$ 420 by the V_RFD voltage at time T2 as shown, which causes the glitch in the V_SFS voltage 322 discussed in FIG. 3 around time T2.

At time T3, the reset signal RST is switched OFF, which therefore turns OFF the reset transistor 108 and decouples the "top plate" of the source follower capacitance $C_{SF}$ 420 from the V_RFD voltage.

However, as shown at time T4, as the voltage V_SFS 322 at the source terminal of the source follower coupled amplifier transistor 110 is restored to its static level 330, the voltage at the "bottom plate" of the source follower capacitance $C_{SF}$ 420, which is coupled to the source terminal of the source follower coupled amplifier transistor 110, is pulled up as shown in FIG. 4. Accordingly, charges are therefore transferred from the floating diffusion capacitance $C_{FD}$ 418 to the "top plate" of the source follower capacitance $C_{SF}$ 420 as shown in FIG. 4, which causes the floating diffusion voltage V_FD 306 to be boosted in accordance with the teachings of the present invention.

Figure 5:
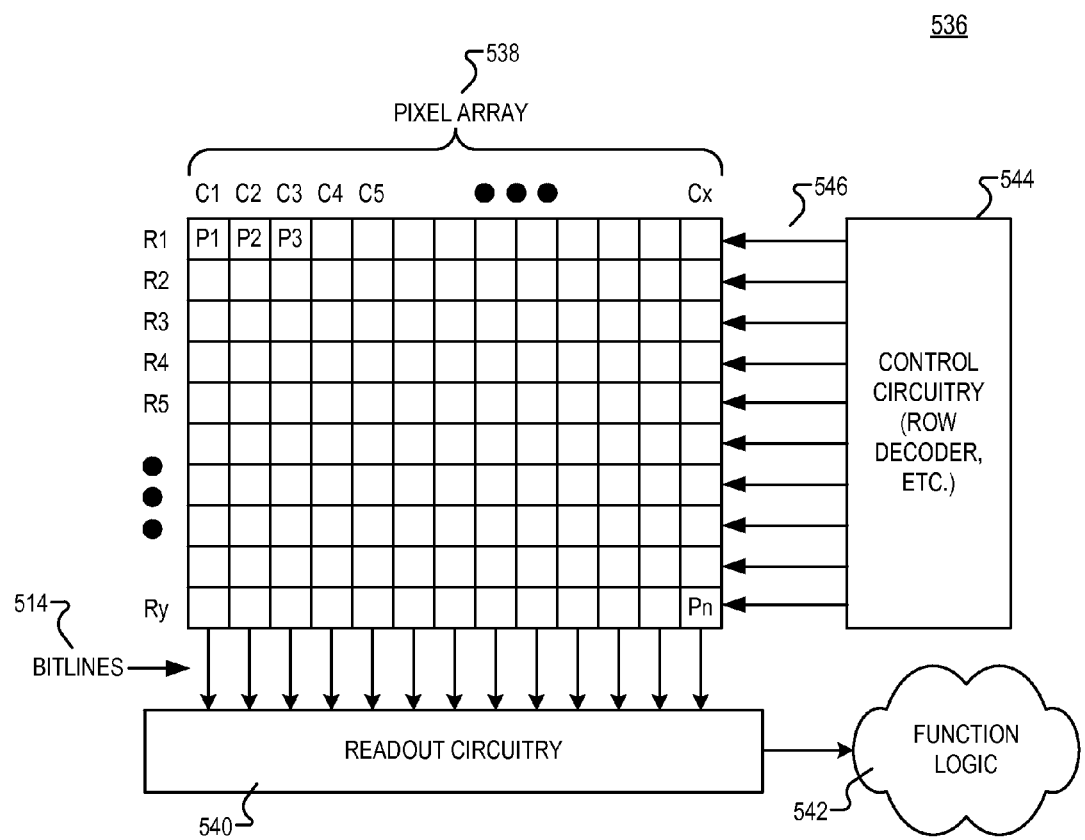
FIG. 5 is a block diagram illustrating an imaging system including an array of pixel cells in accordance with the teachings of the present invention.

FIG. 5 is a block diagram illustrating an imaging system 536 including an array of pixel cells in accordance with the teachings of the present invention. In particular, as shown in the depicted example, the imaging system 536 includes a pixel array 538, readout circuitry 540, function logic 542, and control circuitry 544 in accordance with the teachings of the present invention.

As shown in the example illustrated in FIG. 5, pixel array 538 is a two dimensional (2D) array of pixel cells (e.g., pixel cells P1, P2, Pn). In one example, each of the pixel cells P1, P2, P3, . . . , Pn may be examples of pixel cells 100 of FIG. 1 featuring boosted floating diffusion reset levels, as shown and described above in FIGS. 1-4 in accordance with the teachings of the present invention. Accordingly, it should therefore be appreciated that similarly named and numbered elements referenced above are coupled and function as described below. As illustrated, each pixel cell is arranged into a row (e.g., rows R1 to Ry) and a column (e.g., column C1 to Cx) to acquire image data for an image of a person, place, object, etc., which can then be used to render a 2D image of the person, place, object, etc., in accordance with the teachings of the present invention.

In one example, after floating diffusions of each pixel cell P1, P2, P3, . . . , Pn of each pixel cell have been reset with boosted reset levels, and then accumulated its image charge in response to incident light as discussed above, the image data generated in response to the image charge is read out by readout circuitry 540 through bitlines 514 and then transferred to function logic 542. In various examples, readout circuitry 540 may include circuitry such as for example current source transistors 116 of FIG. 1, as well as amplification circuitry, analog-to-digital (ADC) conversion circuitry, or the like. Function logic 542 may include digital circuitry and may simply store the image data or even manipulate the image data with image signal processing techniques to apply post image effects (e.g., crop, rotate, remove red eye, adjust brightness, adjust contrast, or otherwise). In one example, readout circuitry 540 may read out a row of image data at a time along bitlines 514 (illustrated) or may read out the image data using a variety of other techniques (not illustrated), such as for example a serial read out or a full parallel read out of all pixels simultaneously.

In one example, control circuitry 544 is coupled to pixel array 538 to control operational characteristics of pixel array 538. For example, control circuitry 544 may generate a shutter signal and other control signals coupled to pixel array 538 to control image acquisition. In one example, the shutter signal is a global shutter signal for simultaneously enabling all pixel cells within pixel array 538 to simultaneously capture their respective image data during a single acquisition window. In another example, the shutter signal is a rolling shutter signal such that each row, column, or group of pixels is sequentially enabled during consecutive acquisition windows.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for boosting a reset level in a pixel cell, comprising:
    switching ON a reset transistor coupled between a reset voltage and a floating diffusion of the pixel cell to charge the floating diffusion to a first reset level during a reset operation of the floating diffusion, wherein the floating diffusion is coupled to an input terminal of an amplifier transistor;
    switching from OFF to ON a select transistor coupled between an output terminal of the amplifier transistor and an output bitline of the pixel cell during the floating diffusion reset operation to initially discharge the output terminal of the amplifier transistor through the select transistor; and
    switching OFF the reset transistor after the output terminal of the amplifier transistor has been initially discharged in response to the switching ON of the select transistor during the floating diffusion reset operation,
    wherein the output terminal of the amplifier transistor charges to a static level after being initially discharged in response to the switching ON of the select transistor during the reset operation of the floating diffusion, and
    wherein the floating diffusion coupled to the input terminal of the amplifier transistor follows the output terminal of the amplifier transistor across an amplifier capacitance coupled between the input terminal and the output terminal of the amplifier transistor to boost the reset level of the floating diffusion from the first reset level to a second reset level as the output terminal of the amplifier transistor charges to the static level.

2. The method of claim 1 further comprising discharging the output terminal of the select transistor to a reference voltage before the switching ON of the select transistor.

3. The method of claim 2 wherein the discharging of the output terminal of the select transistor to the reference voltage comprises discharging the output terminal of the select transistor to ground with a current source coupled to the output terminal of the select transistor through an output bitline coupled to the pixel cell.

4. The method of claim 1 wherein a voltage difference between the input terminal of the amplifier transistor and the output terminal of the amplifier transistor across the amplifier capacitance is substantially equal to a threshold voltage of the amplifier transistor before said switching from OFF to ON the select transistor.

5. The method of claim 1 wherein the amplifier transistor is a source follower coupled transistor.

6. The method of claim 1 wherein the amplifier capacitance is a gate source capacitance of the amplifier transistor.

7. The method of claim 1 wherein the floating diffusion includes a floating diffusion capacitance coupled to the input terminal of the amplifier transistor.

8. A pixel cell, comprising:
    a photodiode coupled to photogenerate charge in response to incident light during an integration period;
    a transfer transistor coupled to the photodiode to transfer the charge from the photodiode;
    a floating diffusion coupled to the transfer transistor to receive the charge transferred from the photodiode;
    a reset transistor coupled between a reset voltage and the floating diffusion to reset the charge in the floating diffusion to a first reset level during a floating diffusion reset operation;
    an amplifier transistor having an input terminal coupled to the floating diffusion to generate an amplified signal at an output terminal of the amplifier transistor in response to the charge in the floating diffusion, wherein the amplifier transistor includes an amplifier capacitance coupled between the input terminal and the output terminal of the amplifier transistor; and
    a select transistor coupled between the output terminal of the amplifier transistor and an output bitline of the pixel cell, wherein the select transistor is coupled to be switched from OFF to ON to initially discharge the output terminal of the amplifier transistor through the select transistor during the floating diffusion reset operation before the reset transistor is coupled to be switched OFF to boost a reset level of the floating diffusion through the amplifier capacitance from the first reset level to a second reset level.

9. The pixel cell of claim 8 wherein the amplifier transistor comprises a source follower coupled transistor, wherein the amplifier capacitance comprises a gate source capacitance of the source follower coupled transistor coupled between a gate terminal and a source terminal of the source follower coupled transistor.

10. The pixel cell of claim 9 wherein a source capacitance is coupled to the source terminal of the source follower coupled transistor.

11. The pixel cell of claim 8 wherein a current source is coupled to the output bitline, wherein the current source is coupled to discharge an output terminal of the select transistor through the output bitline before the select transistor is switched from OFF to ON.

12. The pixel cell of claim 11 wherein the output terminal of the amplifier transistor is coupled to be initially discharged through the select transistor when the select transistor is switched ON during the floating diffusion reset operation before the reset transistor is coupled to be switched OFF, wherein the output terminal of the amplifier transistor is coupled to charge to a static level after the reset transistor is switched OFF.

13. The pixel cell of claim 12 wherein the reset level of the floating diffusion coupled to the input terminal of the amplifier transistor is coupled to follow the output terminal of the amplifier transistor as the output terminal of the amplifier transistor is charged to the static level after the reset transistor is switched OFF to boost the reset level of the floating diffusion from the first reset level to the second reset level.

14. The pixel cell of claim 13 wherein a voltage difference between the input terminal of the amplifier transistor and the output terminal of the amplifier transistor is substantially equal to a threshold voltage of the amplifier transistor before the select transistor is switched from OFF to ON.

15. The pixel cell of claim 8 wherein the floating diffusion comprises a floating diffusion capacitance coupled to the input terminal of the amplifier transistor.

16. The pixel cell of claim 8 wherein the output bitline includes a bitline capacitance coupled to an output terminal of the select transistor.

17. An imaging system, comprising:
an array of pixel cells, wherein each one of the pixel cells includes:
a photodiode coupled to photogenerate charge in response to incident light during an integration period;
a transfer transistor coupled to the photodiode to transfer the charge from the photodiode;
a floating diffusion coupled to the transfer transistor to receive the charge transferred from the photodiode;
a reset transistor coupled between a reset voltage and the floating diffusion to reset the charge in the floating diffusion to a first reset level during a floating diffusion reset operation;
an amplifier transistor having an input terminal coupled to the floating diffusion to generate an amplified signal at an output terminal of the amplifier transistor in response to the charge in the floating diffusion, wherein the amplifier transistor includes an amplifier capacitance coupled between the input terminal and the output terminal of the amplifier transistor; and
a select transistor coupled between the output terminal of the amplifier transistor and an output bitline of the pixel cell, wherein the select transistor is coupled to be switched from OFF to ON to initially discharge the output terminal of the amplifier transistor through the select transistor during the floating diffusion reset operation before the reset transistor is coupled to be switched OFF to boost a reset level of the floating diffusion through the amplifier capacitance from the first reset level to a second reset level;
control circuitry coupled to the pixel array to control operation of the pixel array; and
readout circuitry coupled to the pixel array to readout image data from the plurality of pixels.

18. The imaging system of claim 17 further comprising function logic coupled to the readout circuitry to store the image data from each one of the plurality of pixel cells.

19. The imaging system of claim 17 wherein the amplifier transistor of each one of the plurality of pixels comprises a source follower coupled transistor, wherein the amplifier capacitance comprises a gate source capacitance of the source follower coupled transistor coupled between a gate terminal and a source terminal of the source follower coupled transistor.

20. The imaging system of claim 17 wherein a current source is coupled to the output bitline coupled between each one of the plurality of pixels, wherein the current source is coupled to discharge the output terminal of the select transistor through the output bitline before the select transistor is switched from OFF to ON.

21. The imaging system of claim 20 wherein the output terminal of the amplifier transistor of each one of the plurality of pixels is coupled to be initially discharged through the select transistor when the select transistor is switched ON during the floating diffusion reset operation before the reset transistor is coupled to be switched OFF, wherein the output terminal of the amplifier transistor is coupled to charge to a static level after the reset transistor is switched OFF.

22. The imaging system of claim 21 wherein the reset level of the floating diffusion coupled to the input terminal of the amplifier transistor of each one of the plurality of pixels is coupled to follow the output terminal of the amplifier transistor as the output terminal of the amplifier transistor is charged to the static level after the reset transistor is switched OFF to boost the reset level of the floating diffusion from the first reset level to the second reset level.

\* \* \* \* \*